United States Patent [19]
Wang et al.

[11] Patent Number: 6,009,321
[45] Date of Patent: *Dec. 28, 1999

[54] SYSTEM AND METHOD FOR CALL TRACING

[75] Inventors: Jin Wang, Richardson; Maria Hemmer, Dallas; Yahya Idrissi, Plano; David Wilding, Rowlett, all of Tex.

[73] Assignee: Northern Telecom Limited, Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/888,767
[22] Filed: Jul. 7, 1997
[51] Int. Cl.$^6$ .................................................. H04Q 7/34
[52] U.S. Cl. .......................... 455/410; 455/414; 455/433; 379/211; 379/133
[58] Field of Search ..................................... 455/415, 414, 455/432, 433, 560, 461, 410; 379/211, 213, 244, 219, 133

[56] References Cited

U.S. PATENT DOCUMENTS

| | | |
|---|---|---|
| 4,464,543 | 8/1984 | Kline et al. .............................. 379/244 |
| 4,698,839 | 10/1987 | De Vaney et al. ........................ 455/560 |
| 5,430,790 | 7/1995 | Williams .................................. 455/414 |
| 5,636,266 | 6/1997 | Ranaganath et al. .................... 455/415 |
| 5,659,604 | 8/1997 | Beckmann ............................... 379/220 |
| 5,727,057 | 3/1998 | Emery et al. ............................. 379/211 |
| 5,742,905 | 4/1998 | Pepe et al. ............................... 455/461 |
| 5,815,810 | 9/1998 | Gallant et al. ............................ 455/433 |

*Primary Examiner*—Wellington Chin
*Assistant Examiner*—Isaak R. Jama
*Attorney, Agent, or Firm*—Haynes & Boone, L.L.P.

[57] ABSTRACT

A system and method for tracing calls, such as those terminating in a wireless telephone system, is disclosed. The system is part of a communication network that uses a switch connected to a caller. The switch extracts information about the caller such as a calling party number and other information useful for tracing the call. Once the information has been extracted, the switch sends the information to a storage device associated with the called party, such as a home location register. The storage device creates a log of the call, storing all the extracted information. When the call is to be traced, a device capable of accessing the storage device can easily retrieve the stored information and thereby identify and locate the caller.

19 Claims, 1 Drawing Sheet

SYSTEM AND METHOD FOR CALL TRACING

TECHNICAL FIELD

This invention relates generally to communication networks, and in particular, to a system and method for tracing calls in the network, even if the called party is a wireless telephone.

BACKGROUND OF THE INVENTION

The expanse of communications networks has grown from the public switched telephone network ("PSTN") to include many different types of networks. For instance, wireless communications networks have grown in popularity such that it is not uncommon for mobile switching centers (MSCs) to have service requests numbering in excess of 100,000 call attempts per hour in a single metropolitan area. In these metropolitan areas, each MSC may serve a network of 100 or more cell sites, or base stations, each of which defining a particular cell.

On occasion, it is important to trace an in-coming call to a land-line telephone or a wireless telephone. The PSTN has systems in place today perform traces for calls terminating to a land-line telephone. However, the systems used for tracing calls terminating to land-line telephones does not work for those terminating to wireless telephones. This is true regardless of whether the caller is using a mobile unit or a land-line device.

The difficulty in tracing calls that terminate to a wireless telephone are inherent with the very nature of wireless communication networks, e.g., the absence of hard, physical links between the MSC and a mobile unit, such as a cellular telephone. In wireless communication networks, the mobile unit subscribes to a particular network of MSCs and the subscribed network maintains a record for the wireless unit in a home location register ("HLR") database. The record includes information such as a home location for the mobile unit, subscribed capabilities such as call waiting or call forwarding, and current status (e.g., active or inactive). The mobile unit may roam, or visit, in many different MSCs that have a signaling link to the HLR. Therefore, each MSC also keeps track of visiting mobile units currently operating in its service area via a database commonly referred to as a visitor location register (VLR). The VLR contains information regarding the services available to each visitor, his subscribed network, his HLR, and his current status.

When an in-coming call attempts to connect to a mobile unit, it first contacts an originating MSC of the mobile units subscribed network. The originating MSC queries the HLR for the mobile unit's location. If the mobile unit is in the area served by the originating MSC, the originating MSC establishes communication with the mobile unit and services the call. If the mobile unit is not in the area, additional MSCs and their associated VLRs must be contacted in order to locate the mobile unit and establish connection.

Presently, the only method for tracing a call terminating in a wireless telephone network is through a service like caller-ID. If the caller allows, caller-ID receives the calling party number ("CPN") for use by the called party. However, caller-ID can be avoided or inhibited by some callers and is not available from other callers, thereby reducing or eliminating its usefulness for tracing. Furthermore, the information from caller-ID is limited in that only the CPN is provided, and is therefore only partially useful.

Therefore, what is needed is a system that can trace all calls, providing as much information as possible.

SUMMARY OF THE INVENTION

The foregoing problems are solved and a technical advance is achieved by a system and method for tracing calls such as those terminating to a wireless telephone system. The system is part of a communication network and uses a switch connected to a caller. The switch extracts information about the caller such as a calling party number, CPN, and/or other connection detail information useful for tracing the call. Once the information has been extracted, the switch sends the information to a home location register ("HLR"). The HLR creates a log of the call, storing all the extracted information. When the call is to be traced, a device capable of accessing the storage device can easily retrieve the stored information.

An advantage of the present invention is that the log is in a central location for retrieval.

Another advantage of the present invention is that the caller can be traced regardless of whether or not the called party is roaming.

Another advantage of the present invention is that the caller can be traced for each attempted call.

Another advantage of the present invention is that it does not matter whether the caller is a land-line telephone or a wireless telephone.

Another advantage of the present invention is that it is provided on the HLR, and is therefore independent of the serving switch.

BRIEF DESCRIPTION OF THE INVENTION

DESCRIPTION OF THE PREFERRED EMBODIMENT

Figure 1:
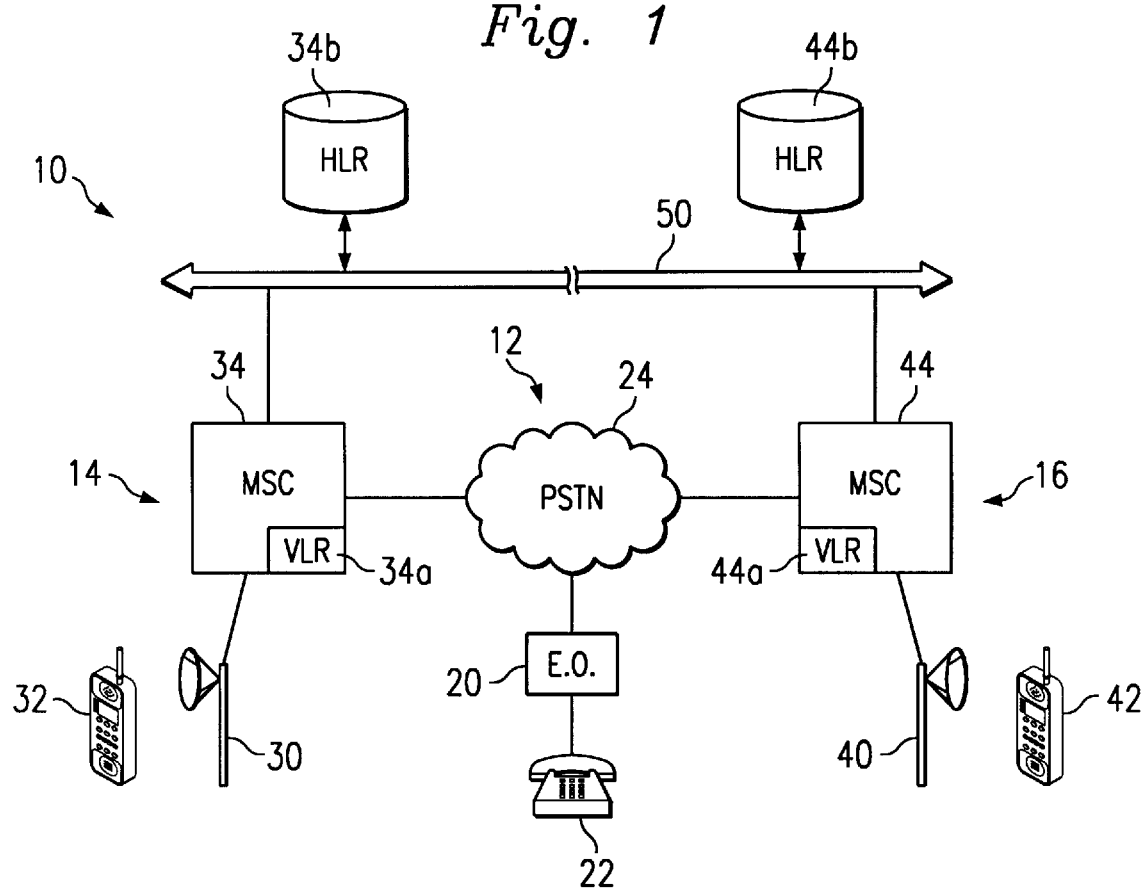
FIG. 1 illustrates an exemplary communication network.

Referring to FIG. 1, the reference numeral 10 designates a simplified communication network. The communication network 10 includes a land-line network 12, a first wireless network 14, and a second wireless network 16. The land-line network 12 is graphically represented by an end office 20 interconnecting a land-line phone 22 to the PSTN 24. The first wireless network 14 is graphically represented by a cell site 30 interconnecting a wireless telephone 32 to an MSC 34. Likewise, the second wireless network 16 is graphically represented by a cell site 40 interconnecting a wireless telephone 42 to an MSC 44. Associated with each of the MSCs 34, 44 are VLRs 34a, 44a, respectively.

The MSCs 34, 44 are physically connected to the PSTN 24 thereby allowing any combination of calls to be completed between the wireless telephones 32, 42 and the land-line telephone 22. The MSCs 34, 44 are also connected through an intelligent network 50. The intelligent network 50 is a conventional intelligent network that uses conventional network messaging. Also connected to the intelligent network 50 are HLRs 34b, 44b which are associated with the MSCs 34, 44, respectively. The intelligent network 50 is conventionally used for various purposes, including facilitating roaming of the wireless telephones 32, 42 between the two wireless networks 14, 16.

Figure 2:
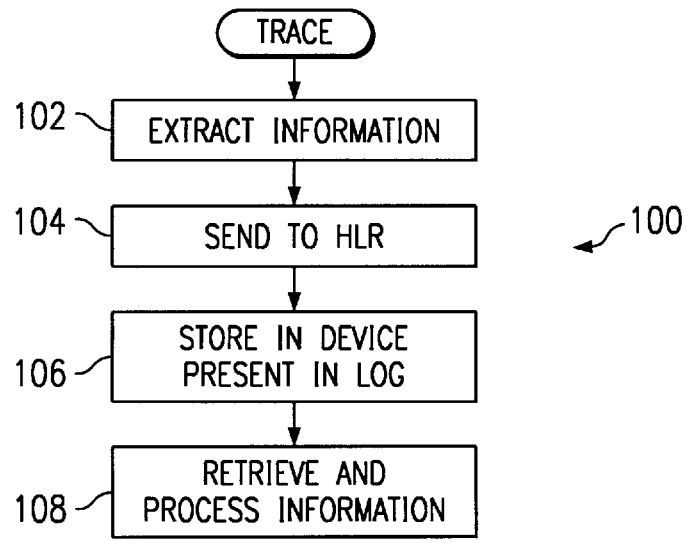
FIG. 2 is a flowchart illustrating a routine for tracing calls in the communication network of FIG. 1.

Referring to FIG. 2, a routine 100 is used for every phone call attempting to terminate to a wireless telephone. For the sake of example, a calling party on the land-line telephone 22 is attempting to call the wireless telephone 32. In this example, the wireless telephone 32 subscribes to the second wireless network 16, but is presently roaming in the first wireless network 14 as shown in FIG. 1. The land-line telephone 22 has initiated the call through the originating MSC (MSC 44).

At step 102, the originating MSC (MSC 44) extracts information from the initiated call. The information includes many parameters such as a called party number (the number for wireless telephone 32) and a calling party number (the number of the land-line telephone 22). At step 104, the originating MSC (MSC 44) sends the extracted information to its associated HLR (HLR 44b). For example, the extracted information may be sent using a Location Request Invoke (LOCREQ) message.

At step 106, the HLR (HLR 44b) retrieves the information from the LOCREQ message in this example, and stores or displays the information, along with the date, time, and an indicator for the serving MSC (MSC 34), in a log. It is understood that the log is generated for every network subscriber.

Upon execution of step 106, the call is completed in a normal, conventional manner. If it is decided that the call should be traced, at step 108 the information stored in device 44b or displayed in the log for the subscriber (wireless telephone 32) can be retrieved and/or processed and the information can be perused. Such retrieval and/or processing can be performed by a computer (not shown) using the protocol of the intelligent network 50 or other devices well known in the industry.

Although illustrative embodiments of the invention have been shown and described, other modifications, changes, and substitutions are intended in the foregoing disclosure. For example, the information may include location information, caller trunk identification, and other information necessary for tracing the caller. Furthermore, the log, and hence the ability to trace a call, may be a per-subscriber and/or per-call user-subscribed feature. Further still, the above described embodiment can be easily implemented in the end office 20 or other switches of the PSTN 24, thereby providing a uniform method for tracing throughout the communications network 10. Accordingly, it is appropriate that the appended claims be construed broadly and in a manner consistent with the scope of the invention.

What is claimed is:

1. A method for tracing a call to a mobile called station, the method comprising the steps of:
   receiving a request to trace the call after the call was initiated;
   determining a predetermined storage device directly from subscription data of the mobile called station, the storage device being previously used to complete the call;
   contacting the storage device; and
   retrieving information about a caller from the storage device, the information being previously extracted from the caller when the caller initiated the call to the mobile called station.

2. The method of claim 1 wherein the steps of extracting, contacting, and providing are performed for every call to the called station.

3. The method of claim 1 wherein the information includes a number identifying the caller.

4. The method of claim 1 wherein the information identifies a location of the caller.

5. The method of claim 1 wherein the mobile switch is an originating switch for the called station and the storage device is a home location register associated with the originating switch.

6. The method of claim 1 wherein the storage device is a visitor location register associated with a second switch that the called station is visiting.

7. A system for tracing a caller having originated a call to a called station in a wireless network, the system comprising:
   a mobile switch connected to the called station for extracting information about the caller and providing the information to a storage device associated with the mobile switch when the call was being originated.
   the storage device for receiving and logging the information from the switch and for facilitating the completion of the call, the storage device being associated with the called station; and
   means for identifying the storage device directly from the called station and retrieving the information from the storage device.

8. The system of claim 7 wherein the switch extracts the information and provides the information to the storage device and uses the storage device to place the call for every call to the called station.

9. The system of claim 7 wherein the information includes a number identifying the caller.

10. The system of claim 7 wherein the information identifies a location of the caller.

11. The system of claim 7 wherein the called station is a mobile unit and a subscriber to a network that includes the switch.

12. The system of claim 11 wherein the storage device is a home location register associated with the called station.

13. The system of claim 11 wherein the storage device is a visitor location register associated with a serving switch with which the called station is linked.

14. A system for tracing a call between a caller and a mobile unit, the system comprising:
   a first mobile switching center ("MSC") of a wireless network to which the mobile unit is a subscriber;
   a register for receiving and storing information from the first MSC;
   a network interconnecting the first MSC with the register;
   means for extracting call information at the MSC upon call initiation, and providingthe information to the register for storage;
   means for identifying the register by subscription information of the mobile unit upon receipt of a trace request;
   means for retrieving the call information from the register, the call information identifying the caller and thereby tracing the call.

15. The system of claim 14 further comprising a second MSC for servicing and linking to the mobile unit, the second MSC also being interconnected by the network.

16. The system of claim 14 wherein the information includes a number identifying the caller.

17. The system of claim 14 wherein the caller is a land-line telephone.

18. The system of claim 14 wherein the register is a home location register that stores additional information for the mobile unit.

19. The system of claim 15 wherein the register is a visitor location register associated with the second MSC.

* * * * *